J. WENMACKER.
Aquarium.

No. 165,639. Patented July 13, 1875.

WITNESSES
INVENTOR

UNITED STATES PATENT OFFICE.

JEROME WENMACKERS, OF PHILADELPHIA, PENNSYLVANIA.

IMPROVEMENT IN AQUARIUMS.

Specification forming part of Letters Patent No. 165,639, dated July 13, 1875; application filed June 23, 1875.

*To all whom it may concern:*

Be it known that I, JEROME WENMACKERS, of Philadelphia, State of Pennsylvania, have invented an Improvement in Aquaria; and I do hereby declare the following to be a full and correct description of the same, reference being had to the accompanying drawings, in which—

Figure 1:
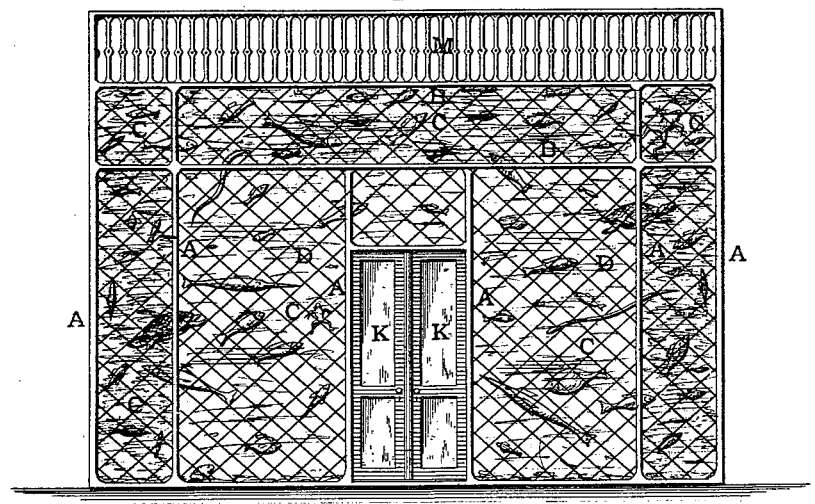
Figure 2:
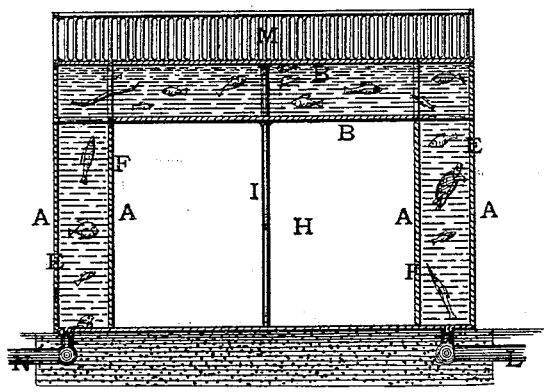

Figure 1 is a front view. Fig. 2 is a transverse sectional view, and Fig. 3 a plan view of my aquarium.

The object of my invention is to construct an aquarium in such a manner that there will be a space within surrounded by the water and the fish, into which space persons may resort to either observe the fish, or for other purposes, and also to relieve the large plates of glass from the strain upon them occasioned by the weight of the water within; and it consists in forming an entire outer as well as inner wall of iron frames and glass plates, between which walls the water and fish are contained, the whole forming a double wall about an inner saloon, accessible by doors, through said double wall. A balustrade may surround the top, which, with a suitable covering, will make an additional place of resort for persons, and at the same time the covering will protect the fish and keep the water clear.

My invention also consists in relieving the glass from the weight of the water, by means of a metallic net-work covering the outer surface of the glass, which net-work is at once highly ornamental, relieves the glass from the inside strain, and protects it from outside injury.

In the drawings, A represents the upright posts, and B the horizontal girders of the frame of my aquarium. These posts and girders are made of metal, and are rabbeted in the usual manner to receive the plates of glass C, which form the walls of the receptacle for the water and the fish.

The glass may be bedded in india-rubber, or other yielding substance, and leaded in a well-known manner.

To relieve the glass from the strain, which in large aquaria has been very disastrous, I place in the rabbet of the frame first, before putting in the glass, a metallic net-work, D, which, of course, will be on the outside surface of the glass, and relieve the glass from strain, by reason of the pressure of the water.

My aquarium may be made of any shape, but I have shown it square.

Figure 3:
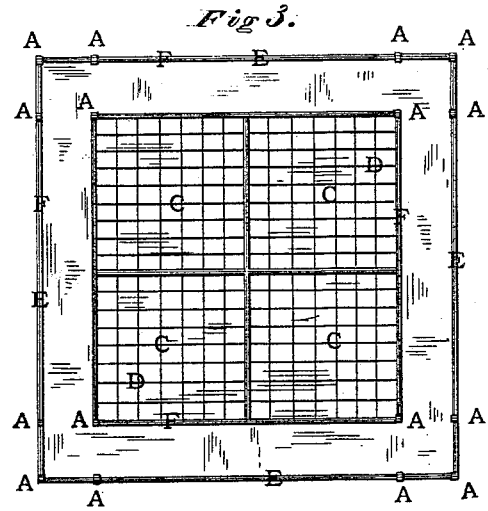

The outer wall E and inner wall F are constructed in the same manner, one within another, as shown in Fig. 3, forming the double wall of the saloon H. Within said saloon H are standards I supporting the top, which is also double, containing water and fish. The saloon H is surrounded on all sides with the double wall containing water and fish, and the bottom also may be in like manner constructed. The doors K, in either side, pass through the double walls, and are for ingress to or egress from the saloon H. Said doors may be constructed in any usual manner. Surrounding the top is a balustrade, M, and as the glass is covered by the netting D, persons will be enabled to occupy the top of the aquarium as a place of resort. To supply the hollow walls renewedly with water, the inlet-pipe L and outlet-pipe N, from some suitable reservoir, are used.

The bottom and foundation may be made of stone and cement, and constructed solid, or it may be formed for the reception of fish, and covered with glass and the netting D.

In the winter the water may be removed from the hollow walls, and its place supplied with vegetation, forming a beautiful herbarium.

Having thus fully described my invention, what I claim, and desire to secure by Letters Patent, is—

1. An aquarium constructed with double walls of glass, or other transparent material, arranged to inclose an inner space or saloon, and provided with one or more passages or door-ways in its sides to afford ingress and egress to and from said saloon, substantially as described.

2. The combination, with the glass plates of an aquarium, of the metallic net-work covering, substantially as and for the purpose set forth.

The above specification of my said invention signed and witnessed at Philadelphia, this 18th day of June, A. D. 1875.

JER. WENMACKERS.

Witnesses:
   H. P. ROCHE,
   J. H. PARKS.